(12) United States Patent
Zou et al.

(10) Patent No.: US 8,804,815 B2
(45) Date of Patent: Aug. 12, 2014

(54) SUPPORT VECTOR REGRESSION BASED VIDEO QUALITY PREDICTION

(75) Inventors: Dekun Zou, West Windsor, NJ (US); Beibei Wang, Morganville, NJ (US)

(73) Assignee: Dialogic (US) Inc., Parsippany, NJ (US)

( * ) Notice: Subject to any disclaimer, the term of this patent is extended or adjusted under 35 U.S.C. 154(b) by 572 days.

(21) Appl. No.: 13/193,802

(22) Filed: Jul. 29, 2011

(65) Prior Publication Data

US 2013/0027568 A1 Jan. 31, 2013

(51) Int. Cl.
*H04N 7/50* (2006.01)
*H04N 11/02* (2006.01)
*H04N 11/04* (2006.01)
*H04B 1/66* (2006.01)
*H04N 7/26* (2006.01)

(52) U.S. Cl.
CPC ............................. *H04N 7/50* (2013.01); *H04N 7/26271* (2013.01)
USPC ............ 375/240.01; 375/240.02; 375/240.27; 348/180; 348/192; 348/720; 382/195; 382/190

(58) Field of Classification Search
USPC .......................................................... 375/240
See application file for complete search history.

(56) References Cited

U.S. PATENT DOCUMENTS

| 6,754,277 | B1 * | 6/2004 | Heinzelman et al. ..... 375/240.27 |
| 7,505,948 | B2 * | 3/2009 | Saidi et al. ....................... 706/14 |
| 7,929,771 | B2 * | 4/2011 | Ko et al. ........................ 382/190 |
| 2002/0089973 | A1 * | 7/2002 | Manor ........................... 370/352 |
| 2002/0097798 | A1 * | 7/2002 | Manor ..................... 375/240.02 |
| 2008/0123749 | A1 * | 5/2008 | Bretillon et al. ......... 375/240.22 |
| 2008/0317111 | A1 * | 12/2008 | Davis ............................. 375/227 |
| 2009/0273678 | A1 * | 11/2009 | Huynh-Thu et al. .......... 348/180 |
| 2011/0102601 | A1 * | 5/2011 | Davis ............................. 348/180 |
| 2012/0020415 | A1 * | 1/2012 | Yang et al. ............... 375/240.27 |
| 2012/0155765 | A1 * | 6/2012 | Joshi et al. ..................... 382/172 |
| 2012/0269441 | A1 * | 10/2012 | Marchesotti et al. ......... 382/195 |
| 2013/0050503 | A1 * | 2/2013 | Xu et al. ....................... 348/180 |
| 2013/0271668 | A1 * | 10/2013 | Argyropoulos et al. ...... 348/720 |

OTHER PUBLICATIONS

"Use of Support Vector Machines for Supplier Performance Modeling", Roger Dingledine et al., Reputation Technologies, Inc., pp. 1-10.
"Based on SVM Automatic Measures of Fingerprint Image Quality", Lianhua Liu et al., Faculty of Computer, Guangdong University of Technology, 2008 IEEE Pacific-Asia Workshop on Computational Intelligence and Industrial Application, pp. 575-578.

* cited by examiner

*Primary Examiner* — Joseph Ustaris
*Assistant Examiner* — Talha Nawaz
(74) *Attorney, Agent, or Firm* — Chapin IP Law, LLC

(57) ABSTRACT

Systems and methods of objective video quality measurement based on support vector machines. The video quality measurement systems can obtain information pertaining to features of a target training video, obtain corresponding information pertaining to features of a reference version of the target training video, and employ the target training features and/or the reference training features to build video quality models using such support vector machines. Based on the target training features and/or the reference training features used to build such video quality models, the video quality models can be made to conform more closely to the human visual system. Moreover, using such video quality models in conjunction with target features of a target video whose perceptual quality is to be measured, and/or reference features of a reference video, the video quality measurement systems can be employed to predict measurements of the perceptual quality of such a target video with increased accuracy.

52 Claims, 8 Drawing Sheets

SUPPORT VECTOR REGRESSION BASED VIDEO QUALITY PREDICTION

CROSS REFERENCE TO RELATED APPLICATIONS

Not applicable

STATEMENT REGARDING FEDERALLY SPONSORED RESEARCH OR DEVELOPMENT

Not applicable

FIELD OF THE INVENTION

The present application relates generally to systems and methods of objective video quality measurement, and more specifically to systems and methods of objective video quality measurement that are based on support vector machines.

BACKGROUND OF THE INVENTION

Systems and methods of objective video quality measurement are known that employ a full-reference approach, a reduced-reference approach, or a no-reference approach. With regard to the full-reference approach to objective video quality measurement, information from target video content (also referred to herein as a/the "target video") is typically compared to corresponding information from a reference version of the target video (also referred to herein as a/the "reference video") to provide a measurement of the perceptual quality of the target video. For example, such information from the target video, and such corresponding information from the reference video, can include a number of characteristics of the respective videos, such as their spectral components, their variations in energy levels, their energy distributions in the frequency domain, etc., any of which may be sensitive to degradation during processing and/or transmission of the respective videos. In such systems and methods that employ a full-reference approach to objective video quality measurement, it is generally assumed that the systems and methods have full access to all of the information from the reference video for comparison to the target video information. However, transmitting all of the information from the reference video over a network for comparison to the target video information at an endpoint, such as a mobile phone or other mobile device, can consume an undesirably excessive amount of network bandwidth. Accordingly, such a full-reference approach to objective video quality measurement is generally considered to be impractical for use in measuring the perceptual quality of a target video at such an endpoint mobile device.

With regard to the reduced-reference approach to objective video quality measurement, information from the target video is typically compared to a reduced amount of corresponding information from the reference video to provide a measurement of the perceptual quality of the target video. In cases where the perceptual quality of the target video is measured at an endpoint, such as a mobile phone or other mobile device, the reduced-reference approach to objective video quality measurement allows a reduced amount of information from the reference video to be transmitted over a network for comparison to the target video information at the endpoint mobile device, thereby reducing the amount of network bandwidth consumed during such transmission.

With regard to the no-reference approach to objective video quality measurement, it is generally assumed that no information from any reference video is available for comparison to the target video information. Accordingly, such systems and methods that employ a no-reference approach to objective video quality measurement typically provide measurements of the perceptual quality of a target video using only the information from the target video.

In the full-reference approach, the reduced-reference approach, and the no-reference approach to objective video quality measurement described above, prior attempts have been made to build video quality models that conform approximately to the human visual system (also referred to herein as an/the "HVS"). For example, information from a target video, as well as corresponding information from a reference video, can pertain to one or more features of the target video (such features also referred to herein as a/the "target features") and one or more features of the reference video (such features also referred to herein as a/the "reference features"), respectively. Further, the full-reference approach, the reduced-reference approach, and the no-reference approach to objective video quality measurement can each employ one or more functions involving the target features and/or the reference features to model video quality. However, such prior attempts to build video quality models that conform approximately to the HVS have met with difficulty, because, for example, the HVS is highly complex and generally not well understood.

It would therefore be desirable to have improved systems and methods of objective video quality measurement that avoid at least some of the drawbacks of the various known objective video quality measurement systems and methods described above.

BRIEF SUMMARY OF THE INVENTION

In accordance with the present application, systems and methods of objective video quality measurement are disclosed that are based on support vector machines. The presently disclosed systems and methods of objective video quality measurement can extract information pertaining to one or more features of at least one target training video (such features also referred to herein as "target training features"), extract corresponding information pertaining to one or more features of at least one reference version of the target training video (such features also referred to herein as "reference training features"), and employ at least the target training features and/or the reference training features to build video quality models using a predetermined support vector machine (SVM). Based at least on the target training features and/or the reference training features used to build such video quality models, the video quality models can be made to conform more closely to the human visual system (also referred to herein as an/the "HVS"). Moreover, using such video quality models in conjunction with one or more target features of at least one target video whose perceptual quality is to be measured, and/or one or more reference features of at least one reference video, the presently disclosed systems and methods of objective video quality measurement can be employed to predict measurements of the perceptual quality of such a target video with increased accuracy.

In accordance with one aspect, an exemplary system for measuring the objective video quality of a target video (such system also referred to herein as a/the "video quality measurement system") can be configured to implement a reduced-reference approach to objective video quality measurement. Such an exemplary video quality measurement system comprises a plurality of functional components, including at least one data collector/feature estimator, at least one reference feature database, an SVM trainer, and an SVM predictor. In accordance with such a reduced-reference approach to objective video quality measurement, the data collector/feature estimator is operative, in a training process, to receive at least one encoded bitstream from at least one target training video (such bitstream also referred to herein as a/the "target training bitstream"), to extract predetermined information from the target training bitstream, and, using at least the predetermined information from the target training bitstream, to perform one or more objective measurements with regard to the target training video to estimate or otherwise obtain one or more target training features of the target training video. The data collector/feature estimator is further operative, in such a training process, to receive at least one encoded bitstream from at least one reference training video (such bitstream also referred to herein as a/the "reference training bitstream"), to extract predetermined information from the reference training bitstream, and, using at least the predetermined information from the reference training bitstream, to perform one or more objective measurements with regard to the reference training video to estimate one or more reference training features of the reference training video. By way of non-limiting example, such objective measurements can include objective measurements of blocking artifacts in the respective videos (also referred to herein as "blockiness measurements"), objective measurements of blur in the respective videos (also referred to herein as "blurriness measurements"), objective measurements of an average quantization index for the respective videos, objective measurements of one or more of the bit rate, the frame rate, the packet loss rate, the resolution, the number of coded macroblocks, etc., associated with the respective videos, as examples, and/or any other suitable objective measurements. Also by way of non-limiting examples, such target training features can be represented by a target feature training set containing a plurality of target feature training vectors that correspond to a predetermined range of quality assessment scores, such as predicted mean opinion scores (MOSs), and such reference training features can be represented by a reference feature training set containing a plurality of reference feature training vectors that correspond to such a predetermined range of quality assessment scores. The SVM trainer is operative to receive the target training features and the reference training features from the data collector/feature estimator, and, using at least the predetermined SVM in association with a predetermined kernel function, to train the relation between at least the reference training features and the target training features, thereby building or otherwise producing a video quality model that is based at least on the target feature training set and the reference feature training set. By way of further non-limiting examples, the predetermined SVM employed by the SVM trainer can be a regression SVM, such as an ε-support vector regression machine, a ν-support vector regression machine, or any other suitable regression SVM, and the predetermined kernel function employed by the SVM trainer can be a radial basis function, a sigmoid model function, a polynomial function, a linear function, or any other suitable kernel function.

In further accordance with such a reduced-reference approach to objective video quality measurement, the data collector/feature estimator is operative to receive one or more encoded bitstreams from one or more reference videos (such bitstreams also referred to herein as "reference bitstreams"), to extract predetermined information from the reference bitstreams, and, using at least the predetermined information from the reference bitstreams, to perform one or more objective measurements with regard to the reference videos to estimate or otherwise obtain one or more reference features of the reference videos. For each of the reference videos, the data collector/feature estimator is further operative to generate, calculate, assign, and/or otherwise obtain a content identifier for a set of reference features that correspond to the reference video, and to store the set of reference features, indexed by its content identifier, within the reference feature database. In addition, the data collector/feature estimator is operative, in a predicting process, to receive at least one encoded bitstream from at least one target video (such bitstream also referred to herein as a/the "target bitstream") whose perceptual quality is to be measured, to extract predetermined information from the target bitstream, to perform one or more objective measurements with regard to the target video using at least the predetermined information from the target bitstream to estimate or otherwise obtain one or more target features of the target video, and to generate, calculate, assign, and/or otherwise obtain a content identifier for the target video. Using the content identifier for the target video as an index into the reference feature database, the data collector/feature estimator is further operative, in such a predicting process, to search for the set of reference features within the reference feature database that correspond to the target features of the target video. The SVM predictor is operative to receive the target features from the data collector/feature estimator, to receive the corresponding set of reference features from the reference feature database, and, based at least on the target features and the reference features, to predict a measurement of the perceptual quality of the target video with reference to the predetermined range of quality assessment scores, using the video quality model built or otherwise produced by the SVM trainer.

In accordance with another aspect, an exemplary system for measuring the objective video quality of a target video can be configured to implement a no-reference approach to objective video quality measurement. Such an exemplary video quality measurement system comprises a plurality of functional components, including at least one data collector/feature estimator, an SVM trainer, and an SVM predictor. In accordance with such an exemplary no-reference approach to objective video quality measurement, the data collector/feature estimator is operative, in a training process, to receive at least one target training bitstream from a target training video, to extract predetermined information from the target training bitstream, and, using at least the predetermined information from the target training bitstream, to perform one or more objective measurements with regard to the target training video to estimate or otherwise obtain one or more target training features of the target training video. Using at least the target training features, and one or more ground-truth quality values for the target training bitstream, the data collector/feature estimator is operative to construct a feature training set containing a plurality of feature training vectors that correspond to a predetermined range of quality assessment scores, such as predicted mean opinion scores (MOSs). The SVM trainer is operative to receive the feature training set from the data collector/feature estimator, and, using at least a predetermined regression SVM in association with a predetermined kernel function, to train the relation between the ground-truth quality values for the target training bitstream and the target training features, thereby building or otherwise producing a video quality model that is based at least on the ground-truth quality values and the feature training set. In addition, the data collector/feature estimator is operative, in a predicting process, to receive at least one target bitstream from a target video whose perceptual quality is to be measured, to extract predetermined information from the target bitstream, and to perform one or more objective measurements with regard to the target video using at least the predetermined information from the target bitstream to estimate or otherwise obtain one or more target features of the target video. The SVM predictor is operative to receive the target features from the data collector/feature estimator, and, based at least on the target features, to predict a measurement of the perceptual quality of the target video with reference to the predetermined range of quality assessment scores, using the video quality model built or otherwise produced by the SVM trainer.

In accordance with a further aspect, end-users of the above-described system for implementing a reduced-reference approach to objective video quality measurement, as well as end-users of the above-described system for implementing a no-reference approach to objective video quality measurement, can be enabled to view one or more target videos whose perceptual quality is to be measured, and to submit one or more subjective quality assessment scores for such target videos to the SVM trainers included in the respective systems. In accordance with such a further aspect, the SVM trainers within the respective systems are operative to employ the subjective quality assessment scores from the end-users as ground-truth quality values for use in refining the video quality models built or otherwise produced by the respective SVM trainers. As the quantities of subjective quality assessment scores submitted by the end-users to the SVM trainers increase, and as the video quality models built or otherwise produced by the respective SVM trainers become more refined, the SVM predictors included in the respective systems can use the video quality models to beneficially provide increasingly accurate predictions of measurements of the perceptual quality of such target videos.

By using at least one or more target training features of at least one target training video and/or one or more reference training features of at least one reference training video, video quality models based on support vector machines can be made to conform more closely to the HVS. Further, using such video quality models in conjunction with one or more target features of at least one target video whose perceptual quality is to be measured, and/or one or more reference features of at least one reference video, measurements of the perceptual quality of such a target video can be predicted with increased accuracy. Moreover, because such measurements of the perceptual quality of a target video can be performed within a system for implementing a reduced-reference approach to objective video quality measurement, as well as a system for implementing a no-reference approach to objective video quality measurement, it can be practical to perform the video quality measurements at an endpoint device, such as a mobile phone.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which:

FIG. 4a is a flow diagram of an exemplary method of operating the exemplary video quality model builder of FIG. 2a;

DETAILED DESCRIPTION OF THE INVENTION

Systems and methods of objective video quality measurement are disclosed that are based on support vector machines. Such systems and methods of objective video quality measurement can extract information pertaining to one or more features of at least one target training video (such features also referred to herein as "target training features"), extract corresponding information pertaining to one or more features of at least one reference version of the target training video (such features also referred to herein as "reference training features"), and employ at least the target training features and/or the reference training features to build video quality models using a predetermined support vector machine (SVM). Based at least on the target training features and/or the reference training features used to build the video quality models, such video quality models can be made to conform more closely to the human visual system (also referred to herein as an/the "HVS"). Moreover, using such video quality models in conjunction with one or more target features of at least one target video whose perceptual quality is to be measured, and/or one or more reference features of at least one reference video, such systems and methods of objective video quality measurement can predict measurements of the perceptual quality of such a target video with increased accuracy.

Figure 1:
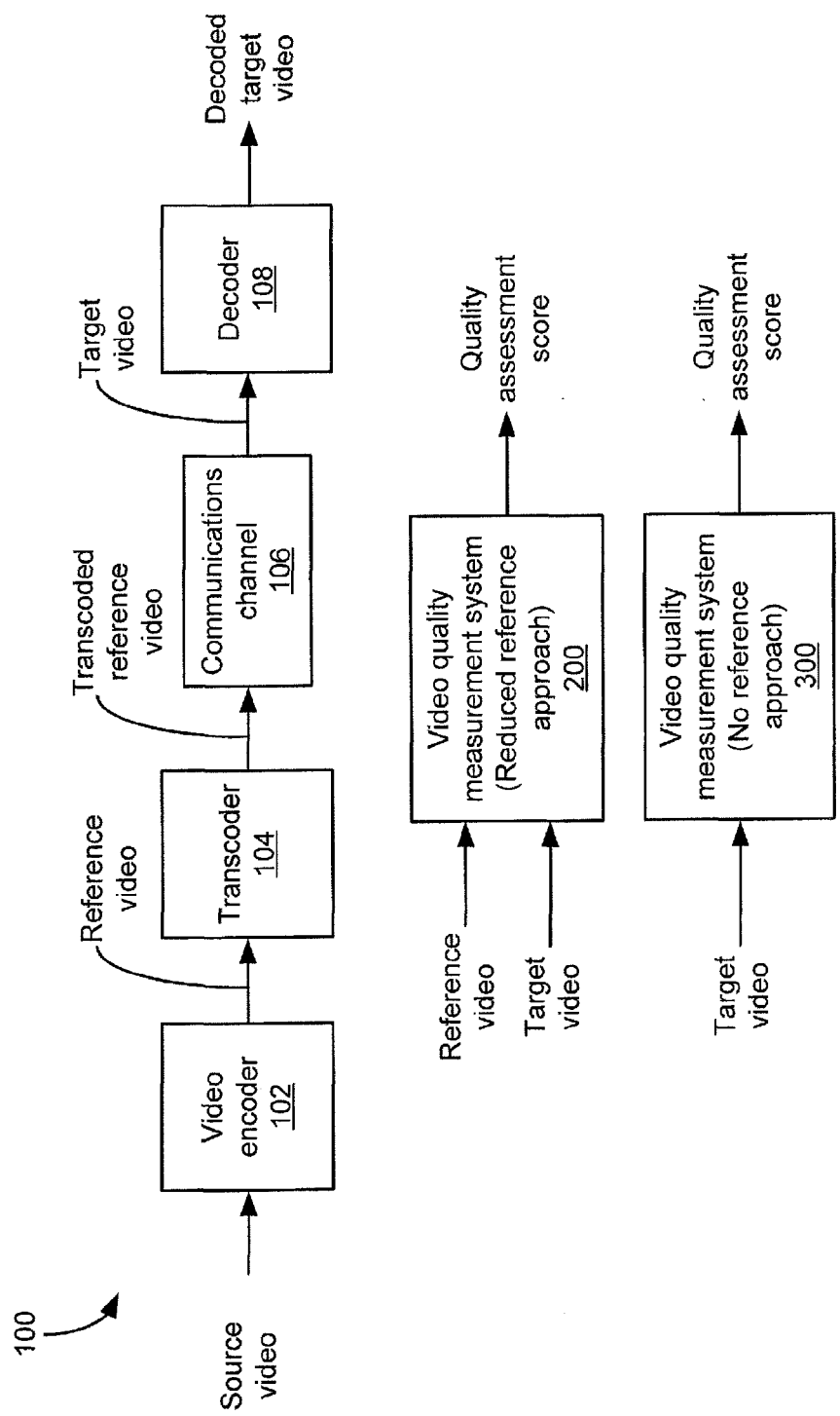
FIG. 1 is a block diagram of an exemplary video communications environment, in which an exemplary system for measuring the perceptual quality of a target video employing a reduced-reference approach to video quality measurement, and an exemplary system for measuring the perceptual quality of a target video employing a no-reference approach to video quality measurement, can be implemented, in accordance with an exemplary embodiment of the present application.

FIG. 1 depicts an exemplary video communications environment 100, in which exemplary systems 200, 300 (each also referred to herein as a/the "video quality measurement system") for measuring the perceptual quality of a target video can be implemented, in accordance with the present application. As shown in FIG. 1, the exemplary video communications environment 100 includes a video encoder 102, a transcoder 104, at least one communications channel 106, and a decoder 108. The video encoder 102 is operative to generate, in the bitstream domain, at least one reference version (also referred to herein as a/the "reference video") of target video content (also referred to herein as a/the "target video") from at least one source video sequence (also referred to herein as a/the "source video") in the pixel domain, and to provide the reference video, compressed according to a first predetermined coding format, to the transcoder 104. For example, the source video can include a plurality of video frames such as YUV video frames, or any other suitable video frames. Further, the source video may include, by way of non-limiting example, one or more of television video, motion picture video, or other broadcast media video, music video, performance video, training video, webcam video, surveillance video, security video, unmanned aerial vehicle (UAV) video, satellite video, closed circuit video, conferencing video, or any other suitable video. The transcoder 104 is operative to transcode, in the bitstream domain, the reference video into a transcoded version of the reference video (also referred to herein as a/the "transcoded reference video"), which is compressed according to a second predetermined coding format that is supported by the communications channel 106. By way of non-limiting example, the first and second predetermined coding formats of the reference video and the transcoded reference video, respectively, may be selected from the H.263 coding format, the H.264 coding format, the MPEG-2 coding format, the MPEG-4 coding format, and/or any other suitable coding format(s). The transcoder 104 is further operative to provide the transcoded reference video for transmission over the communications channel 106, which, for example, can be wire-based, optical fiber-based, wireless, or any suitable combination thereof. Following its transmission over the communications channel 106, the transcoded reference video is referred to herein as a/the "target video." The decoder 108 is operative to receive the target video in the bitstream domain, and to decode the target video, thereby generating a decoded version of the target video (also referred to herein as a/the "decoded target video") in the pixel domain.

In one or more alternative embodiments, the decoded target video generated by the decoder 108, the transcoded reference video generated by the transcoder 104, or the reference video generated by the video encoder 102, may be employed as the target video. The target video can therefore correspond to a bitstream-domain video or a pixel-domain video. Further, in the case where the reference video generated by the video encoder 102 is employed as the target video, the source video may be employed as the reference video. Accordingly, like the target video, the reference video can correspond to a bitstream-domain video or a pixel-domain video. The target video and the reference video are each described herein as a bitstream-domain video for purposes of illustration. It is noted that one or more target videos transmitted over the communications channel 106, and one or more corresponding reference videos generated by the video encoder 102, can correspond to target training videos and reference training videos, respectively, in exemplary training processes implemented by either or both of the video quality measurement systems 200, 300. Further, one or more target videos transmitted over the communications channel 106, and one or more corresponding reference videos generated by the video encoder 102, can also correspond to target videos whose perceptual quality is to be measured, and their corresponding reference videos, respectively, in exemplary predicting processes implemented by either or both of the video quality measurement systems 200, 300.

It is further noted that one or more types of degradation may be introduced into the source video during its processing within the video encoder 102 to generate the reference video. One or more types of degradation may also be introduced into the reference video during its processing within the transcoder 104 to generate the transcoded reference video, and/or into the transcoded reference video during its transmission over the communication channel 106 to produce the target video. By way of non-limiting example, such degradation of the source video, the reference video, and/or the target video, may be due to one or more of image rotation, additive noise, low-pass filtering, compression losses, transmission losses, and/or one or more of any other possible sources or causes of degradation. Moreover, the perceptual quality of each of the source video, the reference video, and the target video can be represented by a predicted mean opinion score (MOS), or any other suitable quality assessment score, measurement, or value. The perceptual quality of the reference video can also be represented by a predetermined constant value.

In some cases, however, the video encoder 102 may not introduce any perceptible degradation into the source video when generating the reference video. For example, the HVS may be unable to differentiate any difference between the perceptual quality of the source video and the perceptual quality of the reference video. Accordingly, in such cases, the reference video may be assumed to have approximately the same perceptual quality as the source video, and may further be assumed to have a higher perceptual quality as compared to that of the target video. As described herein, the source video is assumed to have a higher perceptual quality as compared to that of either the reference video or the target video for purposes of illustration.

Figure 2A:
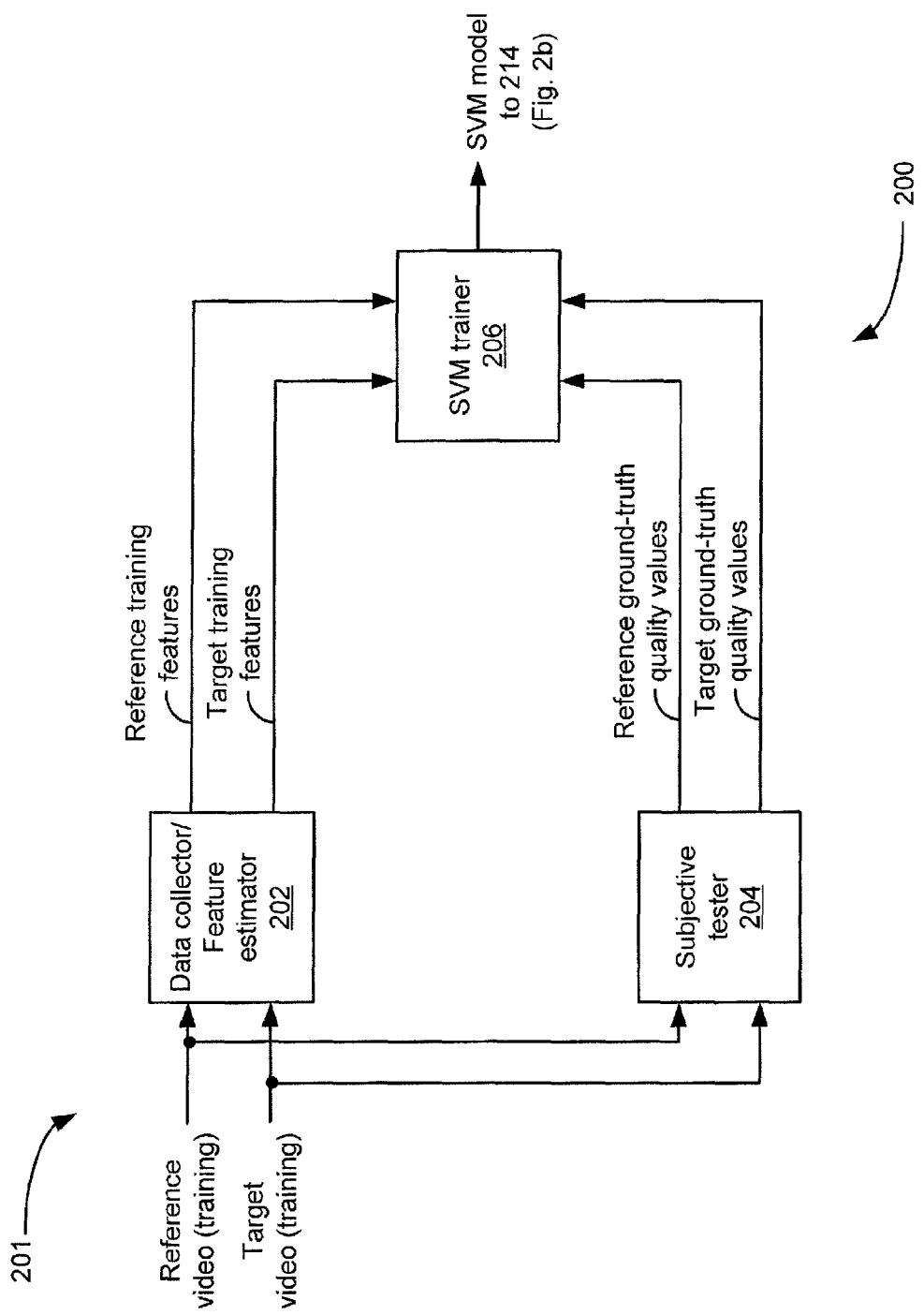
FIG. 2a is a block diagram of an exemplary video quality model builder included within the FIG. 1 exemplary system for measuring the perceptual quality of a target video employing a reduced-reference approach to video quality measurement.
Figure 2B:
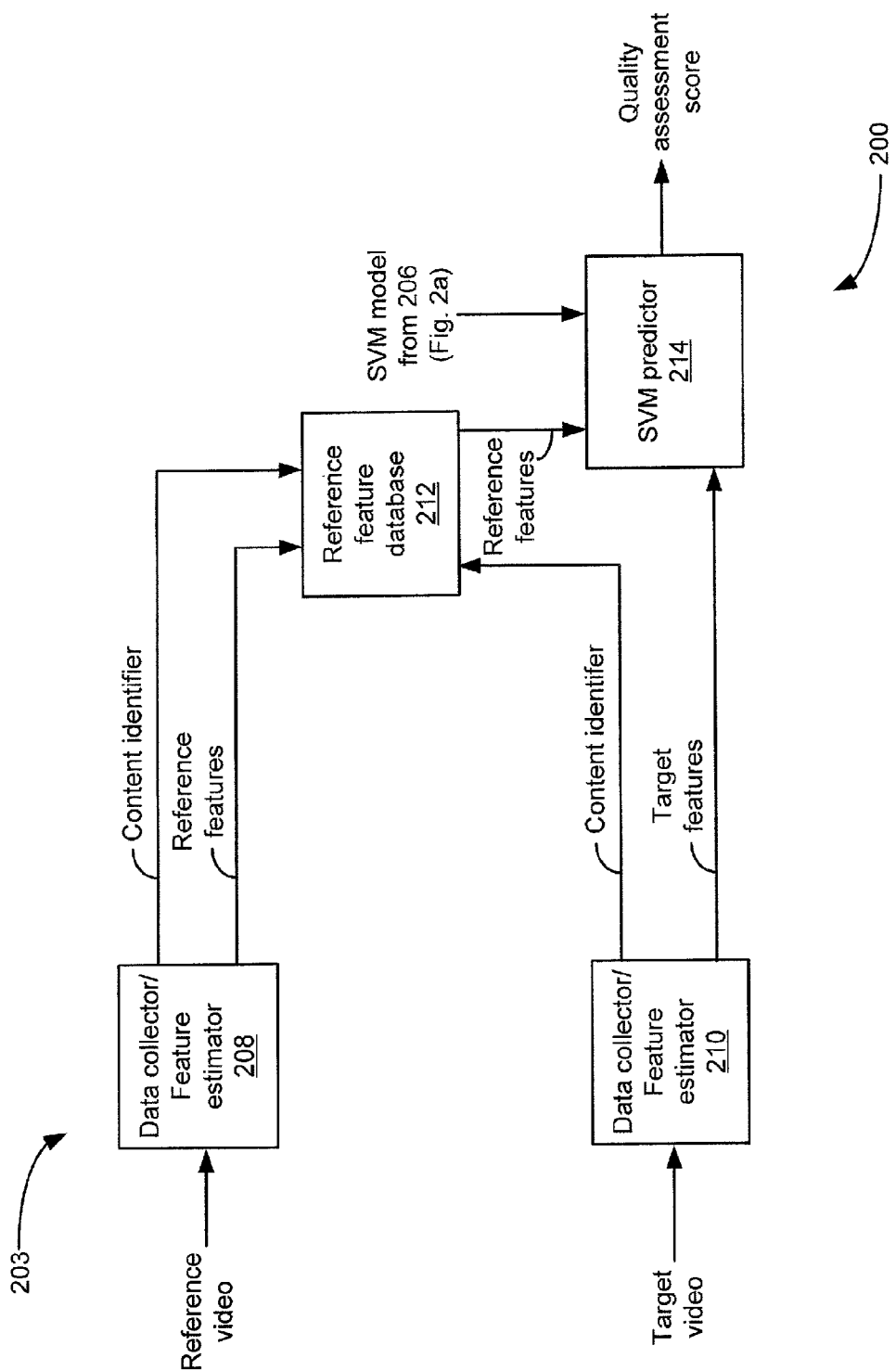
FIG. 2b is a block diagram of an exemplary quality assessment score predictor included within the FIG. 1 exemplary system for measuring the perceptual quality of a target video employing a reduced-reference approach to video quality measurement.

FIGS. 2a and 2b depict an exemplary first functional block, and an exemplary second functional block, respectively, of an illustrative embodiment of the video quality measurement system 200. In accordance with the illustrative embodiment of FIGS. 2a and 2b, the video quality measurement system 200 is operative to measure the perceptual quality of a target video employing a reduced-reference approach to objective video quality measurement. With reference to FIGS. 2a and 2b, the video quality measurement system 200 includes the first functional block, namely, a video quality model builder 201 (see FIG. 2a), and the second functional block, namely, a quality assessment score predictor 203 (see FIG. 2b). As shown in FIG. 2a, the video quality model builder 201 comprises a plurality of functional components, including a data collector/feature estimator 202, a subjective tester 204, and an SVM trainer 206. As shown in FIG. 2b, the quality assessment score predictor 203 also comprises a plurality of functional components, including one or more data collectors/feature estimators 208, 210, a reference feature database 212, and an SVM predictor 214.

In accordance with such an exemplary training process implemented by the video quality measurement system 200, the data collector/feature estimator 202 (see FIG. 2a) is operative to receive at least one encoded bitstream (also referred to herein as a/the "target training bitstream") from at least one target training video (also referred to herein as a/the "target video(s) (training)"), to extract, determine, or otherwise obtain predetermined information from the target training bitstream, and, using at least the predetermined information from the target training bitstream, to perform one or more objective measurements with regard to the target video (training) to estimate one or more target training features of the target video (training). The data collector/feature estimator 202 is further operative to receive at least one encoded bitstream (also referred to herein as a/the "reference training bitstream") from at least one reference training video (also referred to herein as a/the "reference video(s) (training)"), to extract, determine, or otherwise obtain predetermined information from the reference training bitstream, and, using at least the predetermined information from the reference training bitstream, to perform one or more objective measurements with regard to the reference video (training) to estimate one or more reference training features of the reference video (training). For example, the respective training videos can have dynamic video content, such as one or more of low-motion videos, high-motion videos, smooth-textured videos, complex-textured videos, videos that incorporate one or more of panning, zooming, rotating, etc., and/or any other suitable videos having dynamic video content. For example, such objective measurements performed by the data collector/feature estimator 202 can include objective measurements of blocking artifacts in the respective videos (such measurements also referred to herein as "blockiness measurements"), objective measurements of blur in the respective videos (such measurements also referred to herein as "blurriness measurements"), objective measurements of an average quantization index for the respective videos, objective measurements of one or more of the bit rate, the frame rate, the packet loss rate, the resolution, the number of coded macroblocks, etc., associated with the respective videos, as examples, and/or any other suitable objective measurements. Further, the data collector/feature estimator 202 may perform one or more of such objective measurements in accordance with the disclosure of one or more of co-pending U.S. patent application Ser. No. 12/757,389 filed Apr. 9, 2010 entitled BLIND BLOCKING ARTIFACT MEASUREMENT APPROACHES FOR DIGITAL IMAGERY, co-pending U.S. patent application Ser. No. 12/706,165 filed Feb. 16, 2010 entitled A UNIVERSAL BLURRINESS MEASUREMENT APPROACH FOR DIGITAL IMAGERY, and co-pending U.S. patent application Ser. No. 13/025,558 filed Feb. 11, 2011 entitled VIDEO QUALITY MONITORING, each of which is incorporated herein by reference in its entirety. The data collector/feature estimator 202 is also operative to provide the target training features and the reference training features to the SVM trainer 206 (see FIG. 2a).

In further accordance with such an exemplary training process implemented by the video quality measurement system 200, the subjective tester 204 (see FIG. 2a) is operative to receive the target video (training), to receive the reference video (training), and to perform one or more subjective tests on the target training bitstream from the target video (training) and/or on the reference training bitstream from the reference video (training). For example, the subjective tester 204 can be operative to allow one or more end-users, such as one or more human users, or any other suitable end-users, to view the target video (training) on a suitable display device, to view the reference video (training) on such a suitable display device, and to submit subjective quality assessment scores for the target video (training) (also referred to herein as "target ground-truth quality values"), and subjective quality assessment scores for the reference video (training) (also referred to herein as "reference ground-truth quality values"), to the SVM trainer 206. It is noted, however, that in the case where the video encoder 102 does not introduce any perceptible degradation into the source video when generating the reference video, the subjective tester 204 may submit the target ground-truth quality values to the SVM trainer 206, and may omit the reference ground-truth quality values.

It is further noted that such target training features can be represented by a target feature training set containing a plurality of target feature training vectors that correspond to a predetermined range of quality assessment scores, such as a predetermined range of predicted mean opinion scores (MOSs), or any other suitable quality assessment scores. Similarly, such reference training features can be represented by a reference feature training set containing a plurality of reference feature training vectors that correspond to the predetermined range of quality assessment scores. The SVM trainer 206 is operative to receive the target training features and the reference training features from the data collector/feature estimator 202, to receive or otherwise obtain the target ground-truth quality values and the reference ground-truth quality values from the subjective tester 204, and, using a predetermined regression SVM in association with a predetermined kernel function, to train the relation between the reference training features/reference ground-truth quality values and the target training features/target ground-truth quality values, thereby building a video quality model (also referred to herein as an/the "SVM model") that is based at least on the target feature training set and the reference feature training set. For example, the predetermined regression SVM employed by the SVM trainer 206 can be an $\epsilon$-support vector regression machine, a v-support vector regression machine, or any other suitable regression SVM. Further, the predetermined kernel function employed by the SVM trainer 206 can be a radial basis function, a sigmoid model function, a polynomial function, a linear function, or any other suitable kernel function.

Those of ordinary skill in the art will appreciate that a support vector machine (SVM) can be used to perform classification or regression via a hyperplane in a virtual feature space. When used to perform classification, such an SVM (also known as a "classification SVM") is operative to receive a feature training set containing a plurality of feature training vectors as input, and to automatically determine such a hyperplane within such a virtual feature space that can be used to separate the input into two classes. When used to perform regression, such an SVM (also referred to herein as a/the "regression SVM") is operative, using a plurality of feature training vectors, to automatically determine such a hyperplane within such a virtual feature space, and to derive a function based on the hyperplane that estimates a real-valued function.

In accordance with the illustrative embodiment of FIGS. 2a and 2b, a regression SVM can be used to predict qualitative outcomes, such as measurements of the perceptual quality of a target video. For example, when building an SVM model based at least on a target feature training set and/or a reference feature training set, the SVM trainer 206 (see FIG. 2a) can assign a weight value for each feature training vector. Each feature training vector having a non-zero weight value is referred to herein as a "support vector," and each feature training vector having a weight value equal to zero is deemed to contain redundant training data. As described above, the predetermined regression SVM employed by the SVM trainer 206 can correspond to the $\epsilon$-support vector regression machine. Because such an $\epsilon$-support vector regression machine typically employs a cost function that does not take into account any training data that is close to a predicted qualitative outcome, such as within a predetermined threshold defined by the parameter, $\epsilon$, the $\epsilon$-support vector regression machine generally depends on a subset of the training data. As further described above, the predetermined regression SVM employed by the SVM trainer 206 can also be the v-support vector regression machine. Such a v-support vector regression machine typically employs the parameter, v, to control the upper bound on a fraction of the feature training vectors containing redundant training data, and to control the lower bound on a fraction of the support vectors. In such a regression SVM, the SVM trainer 206 can employ the predetermined kernel function to automatically determine an optimum hyperplane within such a virtual feature space for use in deriving the function that estimates a real-valued function. Such a real-valued function can be used by the SVM trainer 206, when building the SVM model, to classify target features and/or reference features that are non-linear functions of attributes of the feature training vectors.

In accordance with such an exemplary predicting process implemented by the video quality measurement system 200, the data collector/feature estimator 208 (see FIG. 2b) is operative to receive one or more encoded bitstreams from one or more reference videos (such bitstreams also referred to herein as "reference bitstreams"), to extract, determine, or otherwise obtain predetermined information from the reference bitstreams, and, using at least the predetermined information from the reference bitstreams, to perform one or more objective measurements with regard to the reference videos to estimate one or more reference features of the reference videos. For each of the reference videos, the data collector/feature estimator 208 is further operative to generate, calculate, assign, and/or otherwise obtain a content identifier for a set of reference features that correspond to the reference video, and to store the set of reference features, indexed by its content identifier, within the reference feature database 212 (see FIG. 2b). In addition, the data collector/feature estimator 210 (see FIG. 2b) is operative to receive at least one encoded bitstream from at least one target video (such bitstream also referred to herein as a/the "target bitstream") whose perceptual quality is to be measured, to extract, determine, or otherwise obtain predetermined information from the target bitstream, to perform one or more objective measurements with regard to the target video using the predetermined information from the target bitstream to estimate one or more target features of the target video, and to generate, calculate, assign, and/or otherwise obtain a content identifier for the target video. For example, the reference features and the target features employed in the predicting process can include all or a portion of the reference features and the target features employed in the training process. Further, because the target video and the reference version of the target video are based on the same video content, the content identifier for the target video corresponds to the content identifier for the reference video. The data collector/feature estimator 210 can therefore use the content identifier for the target video as an index into the reference feature database 212 to search for the set of reference features that correspond to the target features of the target video. The SVM predictor 214 (see FIG. 2b) is operative to receive the target features from the data collector/feature estimator 210, to receive the corresponding set of reference features from the reference feature database 212, to receive information pertaining to the SVM model built by the SVM trainer 206, and, based at least on the target features and the reference features, to predict, using at least the information pertaining to the SVM model, measurements of the perceptual quality of the target video with reference to the predetermined range of quality assessment scores. For example, the SVM predictor 214 can determine such quality assessment scores for the target video based at least on the non-zero weight values assigned to the support vectors for the respective video quality measurements.

Figure 3A:
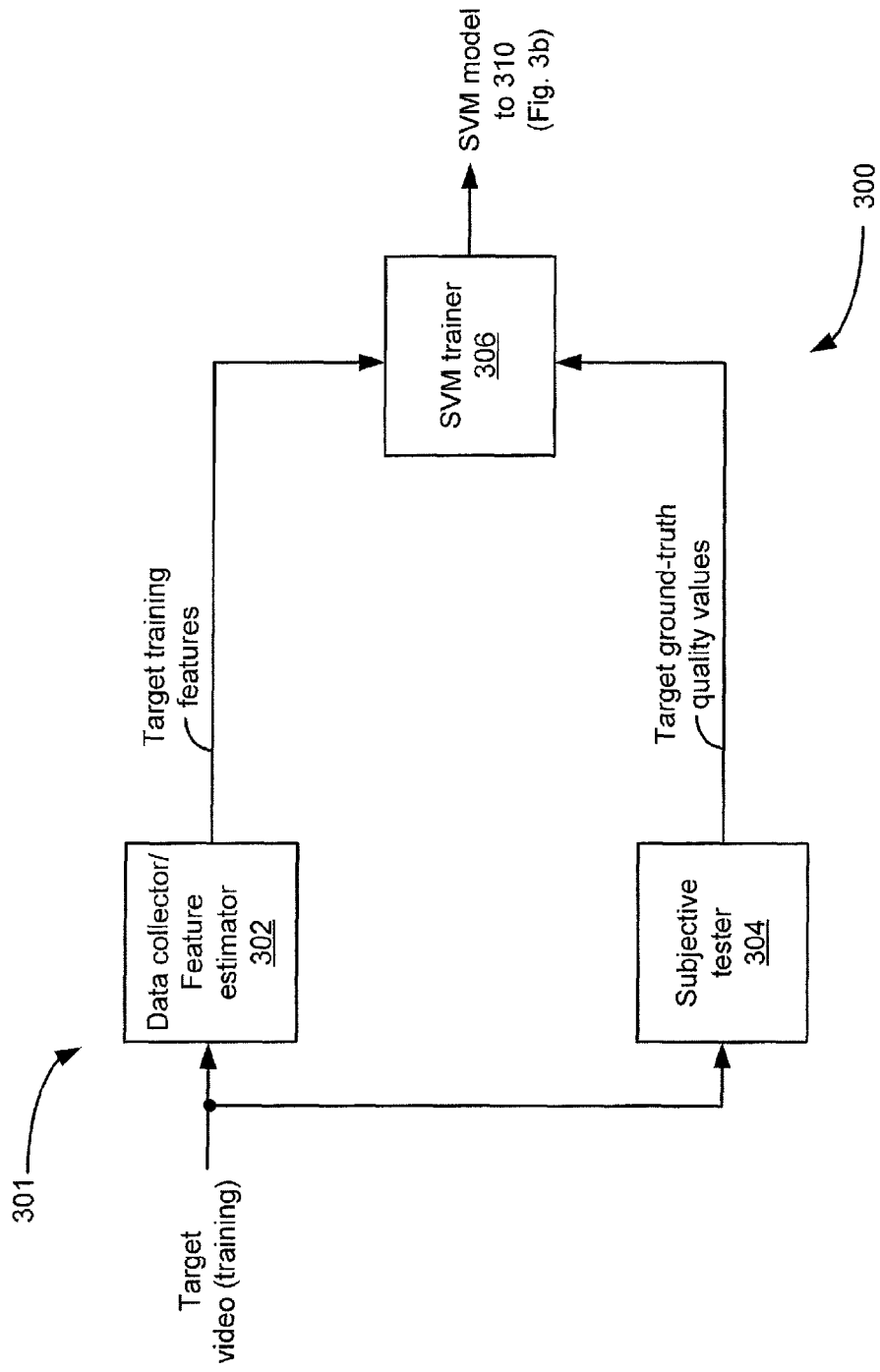
FIG. 3a is a block diagram of an exemplary video quality model builder included within the FIG. 1 exemplary system for measuring the perceptual quality of a target video employing a no-reference approach to video quality measurement.
Figure 3B:
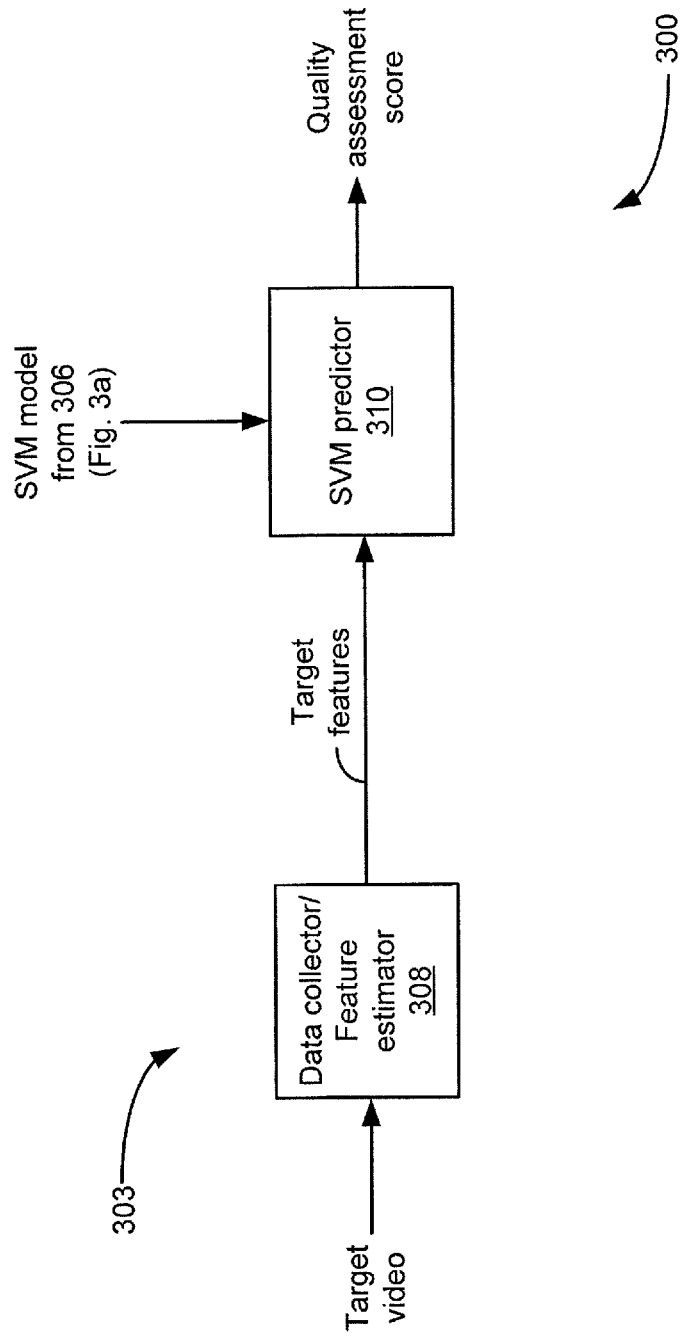
FIG. 3b is a block diagram of an exemplary quality assessment score predictor included within the FIG. 1 exemplary system for measuring the perceptual quality of a target video employing a no-reference approach to video quality measurement.

FIGS. 3a and 3b depict an exemplary first functional block, and an exemplary second functional block, respectively, of an illustrative embodiment of the video quality measurement system 300. In accordance with the illustrative embodiment of FIGS. 3a and 3b, the video quality measurement system 300 is operative to measure the perceptual quality of a target video employing a no-reference approach to objective video quality measurement. The video quality measurement system 300 includes the first functional block, namely, a video quality model builder 301 (see FIG. 3a), and the second functional block, namely, a quality assessment score predictor 303 (see FIG. 3b). As shown in FIG. 3a, the video quality model builder 301 comprises a plurality of functional components, including a data collector/feature estimator 302, a subjective tester 304, and an SVM trainer 306. As shown in FIG. 3b, the quality assessment score predictor 303 also comprises a plurality of functional components, including a data collector/feature estimator 308, and an SVM predictor 310.

Like the video quality measurement system 200 (see FIGS. 2a and 2b), the video quality measurement system 300 (see FIGS. 3a and 3b) can be implemented within the exemplary video communications environment 100 (see FIG. 1). Moreover, one or more target videos transmitted over the communications channel 106 (see FIG. 1) can correspond to target videos (training) in accordance with an exemplary training process implemented by the video quality measurement system 300. One or more target videos transmitted over the communications channel 106 can also correspond to target videos whose perceptual quality is to be measured, in accordance with an exemplary predicting process implemented by the video quality measurement system 300.

In accordance with such an exemplary training process implemented by the video quality measurement system 300, the data collector/feature estimator 302 (see FIG. 3a) is operative to receive at least one target training bitstream from a target video (training), to extract, determine, or otherwise obtain predetermined information from the target training bitstream, and, using the predetermined information from the target training bitstream, to perform one or more objective measurements with regard to the target video (training) to estimate one or more target training features of the target video (training). Such target training features can be represented by a target feature training set containing a plurality of target feature training vectors that correspond to a predetermined range of quality assessment scores, such as a predetermined range of predicted mean opinion scores (MOSs), or any other suitable quality assessment scores, measurements, or values. The data collector/feature estimator 302 is further operative to provide the target training features to the SVM trainer 306 (see FIG. 3a).

In further accordance with such an exemplary training process implemented by the video quality measurement system 300, the subjective tester 304 (see FIG. 3a) is operative to receive the target video (training), and to perform one or more subjective tests on the target training bitstream from the target video (training). Like the subjective tester 204 (see FIG. 2a), the subjective tester 304 can be operative to allow one or more end-users, such as one or more human users, and/or any other suitable end-users, to view the target video (training) on a suitable display device, and to submit subjective quality assessment scores for the target video (training) (also referred to herein as "target ground-truth quality values") to the SVM trainer 306. The SVM trainer 306 is operative to receive the target training features from the data collector/feature estimator 302, to receive or otherwise obtain the target ground-truth quality values from the subjective tester 304, and, using a predetermined regression SVM in association with a predetermined kernel function, to train the relation between the target ground-truth quality values and the target training features, thereby building a video quality model (also referred to herein as an/the "SVM model") that is based at least on the target feature training set. For example, the predetermined regression SVM employed by the SVM trainer 306 can be the ε-support vector regression machine, the ν-support vector regression machine, or any other suitable regression SVM. Further, the predetermined kernel function employed by the SVM trainer 306 can be a radial basis function, a sigmoid model function, a polynomial function, a linear function, or any other suitable kernel function.

In accordance with such an exemplary predicting process implemented by the video quality measurement system 300, the data collector/feature estimator 308 (see FIG. 3b) is operative to receive at least one encoded bitstream from at least one target video (such bitstream also referred to herein as a/the "target bitstream") whose perceptual quality is to be measured, to extract, determine, or otherwise obtain predetermined information from the target bitstream, to perform one or more objective measurements with regard to the target video using the predetermined information from the target bitstream to estimate one or more target features of the target video, and to provide the target features to the SVM predictor 310 (see FIG. 3b). The SVM predictor 310 is operative to receive the target features from the data collector/feature estimator 308, to receive information pertaining to the SVM model built by the SVM trainer 306, and, based at least on the target features, to predict, using at least the information pertaining to the SVM model, measurements of the perceptual quality of the target video with reference to the predetermined range of quality assessment scores. For example, the SVM predictor 310 can determine such quality assessment scores for the target video based at least on the non-zero weight values assigned to the support vectors for the respective video quality measurements.

Figure 4A:
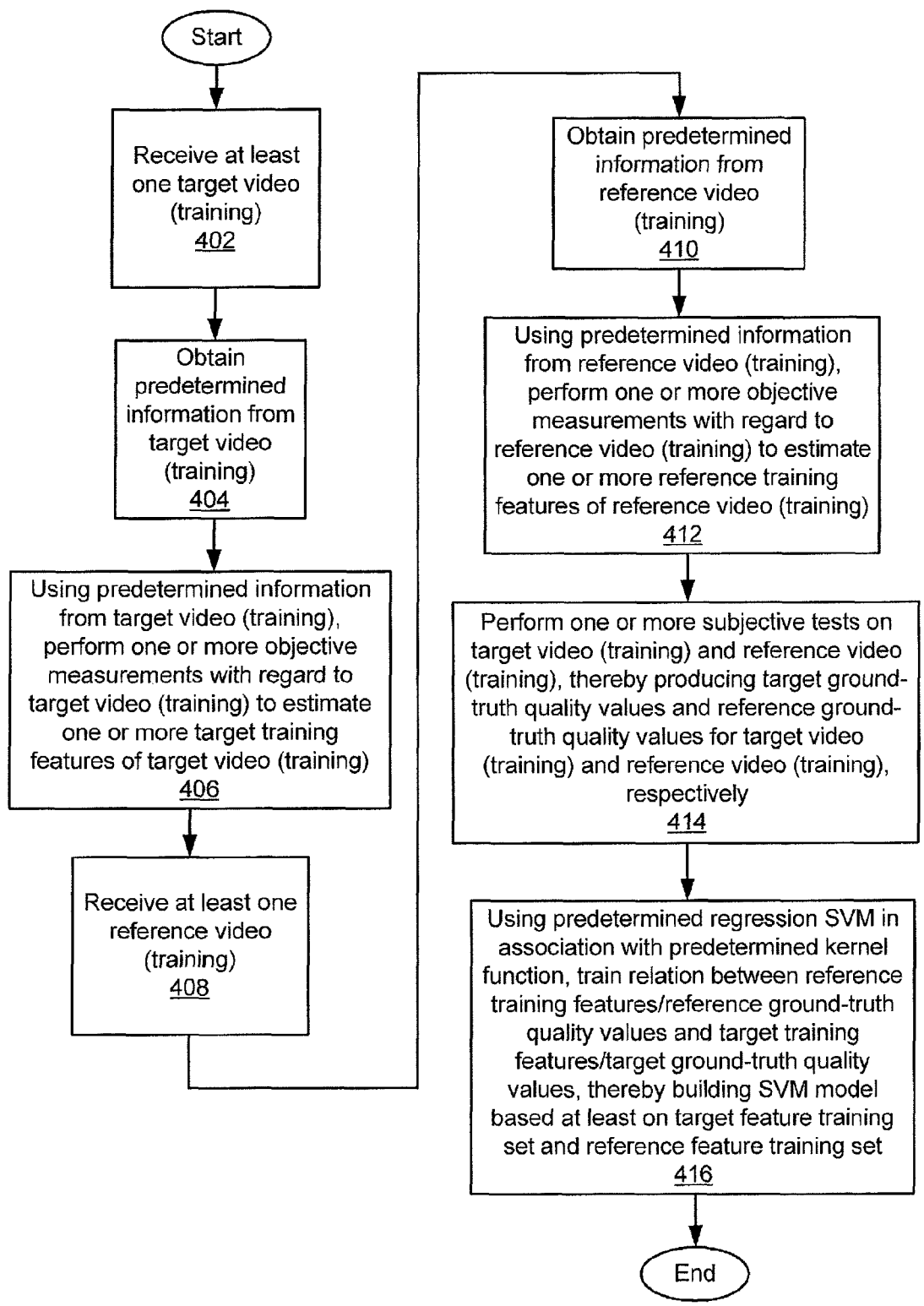

An exemplary training process, implemented by the video quality measurement system 200 (see FIGS. 2a and 2b), is described below with reference to FIG. 4a, as well as FIG. 2a. As depicted in step 402 (see FIG. 4a), at least one target video (training) is received at the data collector/feature estimator 202 (see FIG. 2a). As depicted in step 404 (see FIG. 4a), predetermined information is obtained from the target video (training) by the data collector/feature estimator 202. Using at least the predetermined information from the target video (training), one or more objective measurements are performed, by the data collector/feature estimator 202, with regard to the target video (training) to estimate one or more target training features of the target video (training), such target training features being represented by a target feature training set, as depicted in step 406 (see FIG. 4a). As depicted in step 408 (see FIG. 4a), at least one reference video (training) is received at the data collector/feature estimator 202. As depicted in step 410 (see FIG. 4a), predetermined information is obtained from the reference video (training) by the data collector/feature estimator 202. Using at least the predetermined information from the reference video (training), one or more objective measurements are performed, by the data collector/feature estimator 202, with regard to the reference video (training) to estimate one or more reference training features of the reference video (training), such reference training features being represented by a reference feature training set, as depicted in step 412 (see FIG. 4a). As depicted in step 414 (see FIG. 4a), one or more subjective tests are performed, by the subjective tester 204, on the target video (training) and the reference video (training), thereby producing target ground-truth quality values and reference ground-truth quality values for the target video (training) and the reference video (training), respectively. Using at least a predetermined regression SVM in association with a predetermined kernel function, the relation between the reference training features/reference ground-truth quality values and the target training features/target ground-truth quality values is trained by the SVM trainer 206, thereby building an SVM model that is based at least on the target feature training set and the reference feature training set, as depicted in step 416 (see FIG. 4a).

Figure 4B:
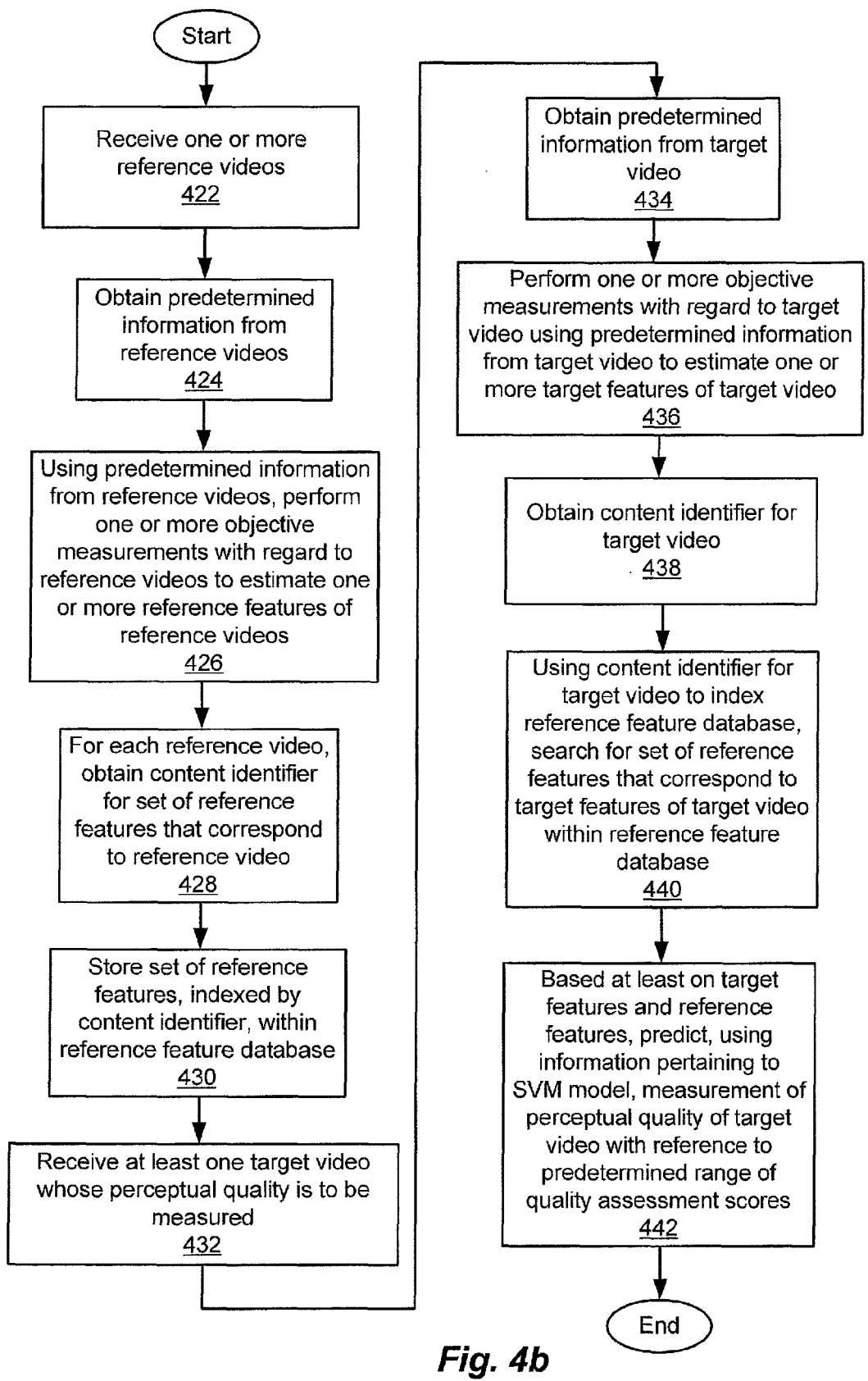
FIG. 4b is a flow diagram of an exemplary method of operating the exemplary quality assessment score predictor of FIG. 2b.

An exemplary predicting process, implemented by the video quality measurement system 200 (see FIGS. 2a and 2b), is described below with reference to FIG. 4b, as well as FIG. 2b. As depicted in step 422 (see FIG. 4b), one or more reference videos are received at the data collector/feature estimator 208 (see FIG. 2b). As depicted in step 424 (see FIG. 4b), predetermined information is obtained from the reference videos by the data collector/feature estimator 208. Using at least the predetermined information from the reference videos, one or more objective measurements are performed, by the data collector/feature estimator 208, with regard to the reference videos to estimate one or more reference features of the reference videos, as depicted in step 426 (see FIG. 4b). For each of the reference videos, a content identifier is generated, calculated, assigned, and/or otherwise obtained by the data collector/feature estimator 208, for a set of reference features that correspond to the respective reference video, as depicted in step 428 (see FIG. 4b). As depicted in step 430 (see FIG. 4b), the set of reference features, indexed by its content identifier, is stored within the reference feature database 212 (see FIG. 2b). As depicted in step 432 (see FIG. 4b), at least one target video whose perceptual quality is to be measured is received at the data collector/feature estimator 210 (see FIG. 2b). As depicted in step 434 (see FIG. 4b), predetermined information is obtained from the target video by the data collector/feature estimator 210. As depicted in step 436 (see FIG. 4b), one or more objective measurements are performed, by the data collector/feature estimator 210, with regard to the target video using at least the predetermined information from the target video to estimate one or more target features of the target video. As depicted in step 438 (see FIG. 4b), a content identifier is generated, calculated, assigned, and/or otherwise obtained by the data collector/feature estimator 210 for the target video. Using at least the content identifier for the target video to index the reference feature database 212 (see FIG. 2b), the set of reference features that correspond to the target features of the target video are searched for within the reference feature database 212 by the data collector/feature estimator 210, as depicted in step 440 (see FIG. 4b). As depicted in step 442 (see FIG. 4b), based at least on the target features and the reference features, a measurement of the perceptual quality of the target video is predicted, determined, or otherwise obtained, by the SVM predictor 214 using at least the information pertaining to the SVM model, with reference to a predetermined range of quality assessment scores.

Figure 5:
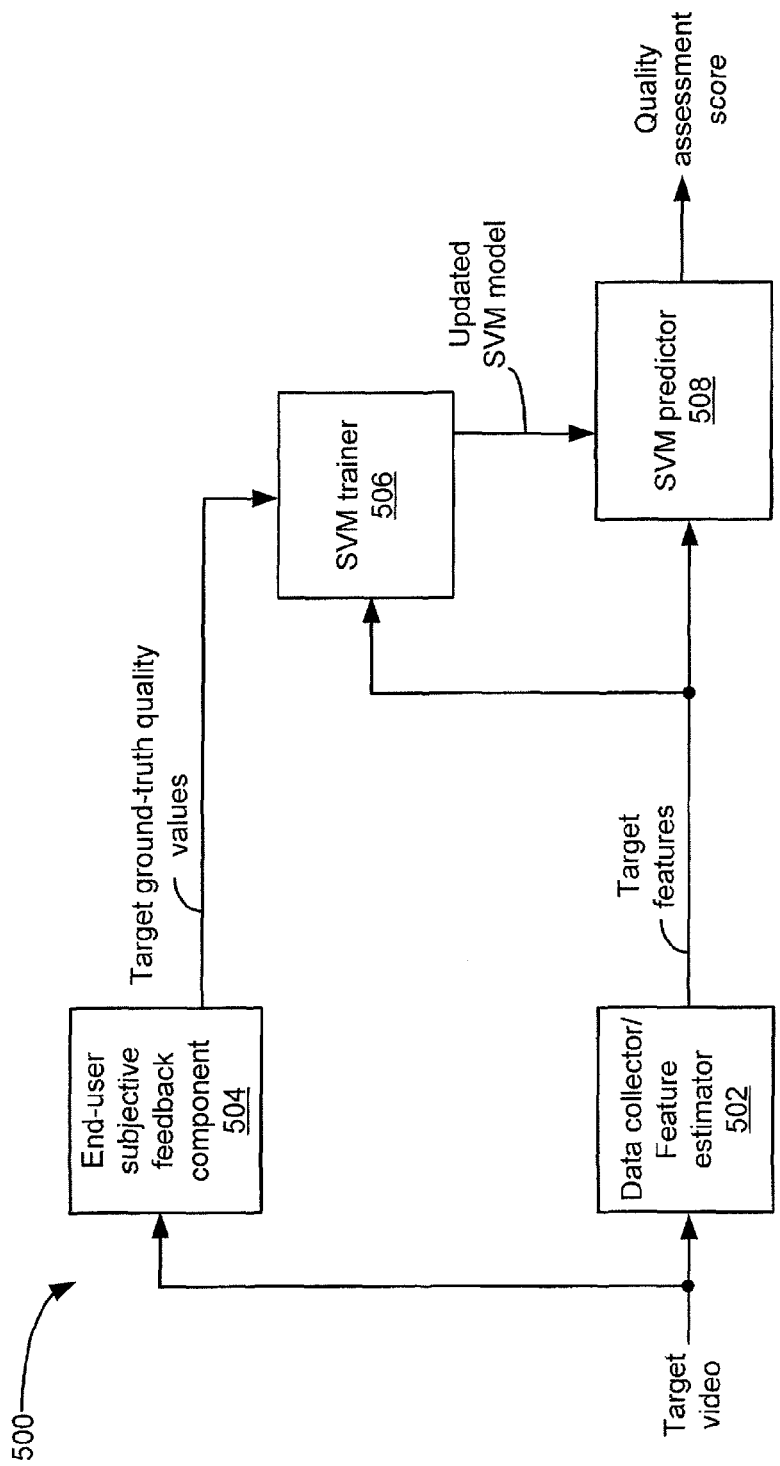
FIG. 5 is a block diagram of an exemplary video quality measurement system configured to enable end-users to view target videos whose perceptual quality is to be measured, to submit subjective quality assessment scores for the target videos, and, using the subjective quality assessment scores, to dynamically update one or more video quality models used to predict the perceptual quality of such target videos.

Having described the above illustrative embodiments of the presently disclosed systems and methods of objective video quality measurement, it is noted that other alternative embodiments or variations may be made/practiced as well. For example, FIG. 5 depicts an illustrative embodiment of an exemplary video quality measurement system 500 that is configured to enable end-users, such as one or more human users, or any other suitable end-users, to view, on a suitable display device, one or more target videos whose perceptual quality is to be measured, and to submit one or more subjective quality assessment scores for such target videos to an SVM trainer 506. It is noted that the video quality measurement system 200 (see FIGS. 2a and 2b), and the video quality measurement system 300 (see FIGS. 3a and 3b), can be similarly configured to enable such end-users of the respective systems 200, 300 to view one or more target videos whose perceptual quality is to be measured, and to submit one or more subjective quality assessment scores for the target videos to the SVM trainers 206, 306, respectively. In one or more alternative embodiments, the SVM trainers 206, 306, 506 within the video quality measurement systems 200, 300, 500, respectively, can be operative to employ the subjective quality assessment scores from the end-users as ground-truth quality values for use in refining the video quality models (e.g., the SVM models) built by the respective SVM trainers 206, 306, 506. Further, as the quantities of subjective quality assessment scores submitted by the end-users to the SVM trainers 206, 306, 506 increase, and as the video quality models built by the SVM trainers 206, 306, 506 are dynamically updated to become more refined, the SVM predictors 214, 310 within the video quality measurement systems 200, 300, respectively, as well as an SVM predictor 508 within the video quality measurement system 500, can use the updated SVM models to provide increasingly accurate predictions of measurements of the perceptual quality of such target videos.

With further reference to FIG. 5, the video quality measurement system 500 comprises a plurality of functional components, including a data collector/feature estimator 502, an end-user subjective feedback component 504, the SVM trainer 506, and the SVM predictor 508. Like the video quality measurement systems 200, 300, the video quality measurement system 500 can be implemented within the video communications environment 100 (see FIG. 1). The data collector/feature estimator 502 is operative, in an exemplary predicting process, to receive at least one encoded bitstream from at least one target video (also referred to herein as a/the "target bitstream") whose perceptual quality is to be measured, to extract, determine, or otherwise obtain predetermined information from the target bitstream, to perform one or more objective measurements with regard to the target video using at least the predetermined information from the target bitstream to estimate one or more target features of the target video, and to provide the target features to the SVM trainer 506 and the SVM predictor 508. The end-user subjective feedback component 504 is operative to receive the target video, and to submit one or more subjective quality assessment scores for the target video (also referred to herein as "target ground-truth quality values") from one or more end-users to the SVM trainer 506. For example, after having played the target video content on a suitable display device, the end-user subjective feedback component 504 can be configured to present the end-users with a vote page, providing the respective end-users with an opportunity to submit the subjective quality assessment scores for the target video. The SVM trainer 506 is operative to receive the target features from the data collector/feature estimator 502, to receive or otherwise obtain the target ground-truth quality values from the end-user subjective feedback component 504, and using at least a predetermined regression SVM in association with a predetermined kernel function, to train the relation between the target ground-truth quality values and the target features, thereby building and/or dynamically updating a video quality model (also referred to herein as an/the "SVM model"). The SVM predictor 508 is operative to receive the target features from the data collector/feature estimator 502, to receive information pertaining to the updated SVM model built by the SVM trainer 506, and, based at least on the target features, to predict, using the information pertaining to the updated SVM model, measurements of the perceptual quality of the target video with increased accuracy.

It is noted that the operations depicted and/or described herein are purely exemplary, and imply no particular order. Further, the operations can be used in any sequence, when appropriate, and/or can be partially used. With the above illustrative embodiments in mind, it should be understood that such illustrative embodiments can employ various computer-implemented operations involving data transferred or stored in computer systems. Such operations are those requiring physical manipulation of physical quantities. Typically, though not necessarily, such quantities take the form of electrical, magnetic, and/or optical signals capable of being stored, transferred, combined, compared, and/or otherwise manipulated.

Further, any of the operations depicted and/or described herein that form part of the illustrative embodiments are useful machine operations. The illustrative embodiments also relate to a device or an apparatus for performing such operations. The apparatus can be specially constructed for the required purpose, or can be a general-purpose computer selectively activated or configured by a computer program stored in the computer. In particular, various general-purpose machines employing one or more processors coupled to one or more computer readable media can be used with computer programs written in accordance with the teachings disclosed herein, or it may be more convenient to construct a more specialized apparatus to perform the required operations.

The presently disclosed systems and methods can also be embodied as computer readable code on a computer readable medium. The computer readable medium is any data storage device that can store data, which can thereafter be read by a computer system. Examples of such computer readable media include hard drives, read-only memory (ROM), random-access memory (RAM), CD-ROMs, CD-Rs, CD-RWs, magnetic tapes, and/or any other suitable optical or non-optical data storage devices. The computer readable media can also be distributed over a network-coupled computer system, so that the computer readable code can be stored and/or executed in a distributed fashion.

The foregoing description has been directed to particular illustrative embodiments of this disclosure. It will be apparent, however, that other variations and modifications may be made to the described embodiments, with the attainment of some or all of their associated advantages. Moreover, the procedures, processes, and/or modules described herein may be implemented in hardware, software, embodied as a computer-readable medium having program instructions, firmware, or a combination thereof. For example, the functions described herein may be performed by a processor executing program instructions out of a memory or other storage device.

It will be appreciated by those skilled in the art that modifications to and variations of the above-described systems and methods may be made without departing from the inventive concepts disclosed herein. Accordingly, the disclosure should not be viewed as limited except as by the scope and spirit of the appended claims.

What is claimed is:

1. A method of measuring perceptual quality of video, the video being provided over at least one communications channel, the method comprising the steps of:
  obtaining one or more target feature training vectors, the one or more target feature training vectors representing one or more target training features of at least one target training video;
  obtaining one or more reference feature training vectors, the one or more reference feature training vectors representing one or more reference training features of at least one reference version of the at least one target training video;
performing regression using at least one of the one or more target feature training vectors and at least one of the one or more reference feature training vectors to produce a video quality model;
receiving a target video over the at least one communications channel;
obtaining, from the target video, information pertaining to at least one or more target features of the target video;
obtaining information pertaining to at least one or more reference features of a reference version of the target video; and
obtaining a measurement of perceptual quality of the target video using at least the video quality model, the measurement of perceptual quality of the target video being based at least on the information pertaining to the one or more target features of the target video, and the information pertaining to the one or more reference features of the reference version of the target video.

2. The method of claim 1 wherein performing regression comprises:
performing support vector regression using at least one of the one or more target feature training vectors and at least one of the one or more reference feature training vectors.

3. The method of claim 2 wherein performing support vector regression comprises:
performing support vector regression using at least a predetermined support vector machine (SVM), the predetermined SVM corresponding to one of an $\epsilon$-support vector regression machine, and a $\nu$-support vector regression machine.

4. The method of claim 2 wherein the video quality model comprises a kernel-based video quality model.

5. The method of claim 4 wherein performing support vector regression comprises:
performing support vector regression using at least a predetermined kernel function, the predetermined kernel function corresponding to one of a predetermined radial basis function, a predetermined sigmoid model function, a predetermined polynomial function, and a predetermined linear function.

6. The method of claim 1 further comprising:
obtaining at least one target training bitstream from the at least one target training video; and
obtaining predetermined information from the at least one target training bitstream.

7. The method of claim 6 further comprising:
performing one or more objective measurements with regard to the at least one target training video using at least the predetermined information from the at least one target training bitstream, thereby estimating the one or more target training features of the at least one target training video.

8. The method of claim 7 wherein the one or more objective measurements correspond to one or more of (a) objective measurements of blocking artifacts in the at least one target training video, (b) objective measurements of blur in the at least one target training video, (c) objective measurements of an average quantization index for the at least one target training video, (d) objective measurements of a bit rate associated with the at least one target training video, (e) objective measurements of a frame rate associated with the at least one target training video, (f) objective measurements of a packet loss rate associated with the at least one target training video, (g) objective measurements of a resolution associated with the at least one target training video, and (h) objective measurements of a number of coded macroblocks associated with the at least one target training video.

9. The method of claim 1 further comprising:
obtaining at least one reference training bitstream from the at least one reference version of the at least one target training video; and
obtaining predetermined information from the at least one reference training bitstream.

10. The method of claim 9 further comprising:
performing one or more objective measurements with regard to the at least one reference version of the at least one target training video using at least the predetermined information from the at least one reference training bitstream, thereby estimating the one or more reference training features of the at least one reference version of the at least one target training video.

11. The method of claim 10 wherein the one or more objective measurements correspond to one or more of (a) objective measurements of blocking artifacts in the at least one reference version of the at least one target training video, (b) objective measurements of blur in the at least one reference version of the at least one target training video, (c) objective measurements of an average quantization index for the at least one reference version of the at least one target training video, (d) objective measurements of a bit rate associated with the at least one reference version of the at least one target training video, (e) objective measurements of a frame rate associated with the at least one reference version of the at least one target training video, (f) objective measurements of a packet loss rate associated with the at least one reference version of the at least one target training video, (g) objective measurements of a resolution associated with the at least one reference version of the at least one target training video, and (h) objective measurements of a number of coded macroblocks associated with the at least one reference version of the at least one target training video.

12. The method of claim 1 further comprising:
obtaining a reference bitstream from the reference version of the target video; and
obtaining predetermined information from the reference bitstream.

13. The method of claim 12 further comprising:
performing one or more objective measurements with regard to the reference version of the target video using at least the predetermined information from the reference bitstream, thereby estimating the one or more reference features of the reference version of the target video.

14. The method of claim 13 wherein the one or more objective measurements correspond to one or more of (a) objective measurements of blocking artifacts in the reference version of the target video, (b) objective measurements of blur in the reference version of the target video, (c) objective measurements of an average quantization index for the reference version of the target video, (d) objective measurements of a bit rate associated with the reference version of the target video, (e) objective measurements of a frame rate associated with the reference version of the target video, (f) objective measurements of a packet loss rate associated with the reference version of the target video, (g) objective measurements of a resolution associated with the reference version of the target video, and (h) objective measurements of a number of coded macroblocks associated with the reference version of the target video.

15. The method of claim 1 further comprising:
obtaining a target bitstream from the target video; and
obtaining predetermined information from the target bitstream.

16. The method of claim 15 further comprising:
performing one or more objective measurements with regard to the target video using at least the predetermined information from the target bitstream, thereby estimating the one or more target features of the target video.

17. The method of claim 16 wherein the one or more objective measurements correspond to one or more of (a) objective measurements of blocking artifacts in the target video, (b) objective measurements of blur in the target video, (c) objective measurements of an average quantization index for the target video, (d) objective measurements of a bit rate associated with the target video, (e) objective measurements of a frame rate associated with the target video, (f) objective measurements of a packet loss rate associated with the target video, (g) objective measurements of a resolution associated with the target video, and (h) objective measurements of a number of coded macroblocks associated with the target video.

18. The method of claim 1 further comprising:
obtaining a content identifier for the one or more reference features of the reference version of the target video.

19. The method of claim 18 further comprising:
storing, in a database, the information pertaining to at least one of the one or more reference features of the reference version of the target video, using at least the content identifier for the one or more reference features as an index into the database.

20. The method of claim 19 further comprising:
obtaining a content identifier for the target video.

21. The method of claim 20 further comprising:
accessing, from the database, the information pertaining to at least one of the one or more reference features of the reference version of the target video, using at least the content identifier for the target video as the index into the database.

22. The method of claim 1 further comprising:
obtaining one or more ground-truth quality values for the at least one target training video; and
obtaining one or more ground-truth quality values for the at least one reference version of the at least one target training video.

23. The method of claim 22 wherein performing regression comprises:
performing regression using one or more of (a) the one or more target feature training vectors, (b) the one or more reference feature training vectors, (c) the one or more ground-truth quality values for the at least one target training video, and (d) the one or more ground-truth quality values for the at least one reference version of the at least one target training video.

24. The method of claim 1 further comprising:
obtaining one or more ground-truth quality values for the target video.

25. The method of claim 24 further comprising:
performing regression using at least one of the one or more ground-truth quality values for the target video to produce an updated version of the video quality model.

26. The method of claim 25 wherein obtaining the measurement of perceptual quality of the target video comprises:
obtaining the measurement of perceptual quality of the target video using at least the updated version of the video quality model, the measurement of perceptual quality of the target video being based at least on the information pertaining to the one or more target features of the target video, the information pertaining to the one or more reference features of the reference version of the target video, and the one or more ground-truth quality values for the target video.

27. A method of measuring perceptual quality of video, the video being provided over at least one communications channel, the method comprising the steps of:
obtaining one or more target feature training vectors, the one or more target feature training vectors representing one or more target training features of at least one target training video;
obtaining one or more ground-truth quality values for the at least one target training video;
performing regression using at least one of the one or more target feature training vectors and at least one of the one or more ground-truth quality values for the at least one target training video to produce a video quality model;
receiving a target video over the at least one communications channel;
obtaining, from the target video, information pertaining to at least one or more target features of the target video; and
obtaining a measurement of perceptual quality of the target video using at least the video quality model, the measurement of perceptual quality of the target video being based at least on the information pertaining to the one or more target features of the target video.

28. The method of claim 27 wherein performing regression comprises:
performing support vector regression using at least the one or more target feature training vectors.

29. The method of claim 28 wherein performing support vector regression comprises:
performing support vector regression using at least a predetermined support vector machine (SVM), the predetermined SVM corresponding to one of an $\epsilon$-support vector regression machine, and a $\nu$-support vector regression machine.

30. The method of claim 28 wherein the video quality model comprises a kernel-based video quality model.

31. The method of claim 30 wherein performing support vector regression comprises:
performing support vector regression using at least a predetermined kernel function, the predetermined kernel function corresponding to one of a predetermined radial basis function, a predetermined sigmoid model function, a predetermined polynomial function, and a predetermined linear function.

32. The method of claim 27 further comprising:
obtaining at least one target training bitstream from the at least one target training video; and
obtaining predetermined information from the at least one target training bitstream.

33. The method of claim 32 further comprising:
performing one or more objective measurements with regard to the at least one target training video using at least the predetermined information from the at least one target training bitstream, thereby estimating the one or more target training features of the at least one target training video.

34. The method of claim 33 wherein the one or more objective measurements correspond to one or more of (a) objective measurements of blocking artifacts in the at least one target training video, (b) objective measurements of blur in the at least one target training video, (c) objective measurements of an average quantization index for the at least one target training video, (d) objective measurements of a bit rate associated with the at least one target training video, (e) objective measurements of a frame rate associated with the at least one target training video, (f) objective measurements of a packet loss rate associated with the at least one target training video, (g) objective measurements of a resolution associated with the at least one target training video, and (h) objective measurements of a number of coded macroblocks associated with the at least one target training video.

35. The method of claim 27 further comprising:
obtaining a target bitstream from the target video; and
obtaining predetermined information from the target bitstream.

36. The method of claim 35 further comprising:
performing one or more objective measurements with regard to the target video using at least the predetermined information from the target bitstream, thereby estimating the one or more target features of the target video.

37. The method of claim 36 wherein the one or more objective measurements correspond to one or more of (a) objective measurements of blocking artifacts in the target video, (b) objective measurements of blur in the target video, (c) objective measurements of an average quantization index for the target video, (d) objective measurements of a bit rate associated with the target video, (e) objective measurements of a frame rate associated with the target video, (f) objective measurements of a packet loss rate associated with the target video, (g) objective measurements of a resolution associated with the target video, and (h) objective measurements of a number of coded macroblocks associated with the target video.

38. The method of claim 27 further comprising:
obtaining one or more ground-truth quality values for the at least one target training video.

39. The method of claim 38 wherein performing regression comprises:
performing regression using at least one or more of (a) the one or more target feature training vectors, and (b) the one or more ground-truth quality values for the at least one target training video, thereby producing the video quality model.

40. The method of claim 27 further comprising:
obtaining one or more ground-truth quality values for the target video.

41. The method of claim 40 further comprising:
performing regression using at least one of the one or more ground-truth quality values for the target video to produce an updated version of the video quality model.

42. The method of claim 41 wherein obtaining the measurement of perceptual quality of the target video comprises:
obtaining the measurement of perceptual quality of the target video using at least the updated version of the video quality model, the measurement of perceptual quality of the target video being based at least on the information pertaining to the one or more target features of the target video, and the one or more ground-truth quality values for the target video.

43. A system for measuring perceptual quality of video, the video being provided over at least one communications channel, the system comprising:
at least one feature estimator operative:
to obtain, from at least one or more target feature training vectors, one or more target training features of at least one target training video; and
to obtain, from at least one or more reference feature training vectors, one or more reference training features of at least one reference version of the at least one target training video;
a regression component operative to perform regression using at least one of the one or more target feature training vectors and at least one of the one or more reference feature training vectors to produce a video quality model;
the at least one feature estimator being further operative:
to receive a target video over the at least one communications channel;
to obtain, from the target video, information pertaining to at least one or more target features of the target video;
to receive a reference version of the target video; and
to obtain, from the reference version of the target video, information pertaining to at least one or more reference features of the reference version of the target video; and
a perceptual quality measurement component operative to obtain a measurement of perceptual quality of the target video using at least the video quality model, the measurement of perceptual quality of the target video being based at least on the information pertaining to the one or more target features of the target video, and the information pertaining to the one or more reference features of the reference version of the target video.

44. The system of claim 43 wherein the regression component is further operative to perform support vector regression using at least one of the one or more target feature training vectors and at least one of the one or more reference feature training vectors.

45. The system of claim 44 wherein the regression component is further operative to perform support vector regression using at least a predetermined support vector machine (SVM), the predetermined SVM corresponding to one of an $\epsilon$-support vector regression machine, and a $\nu$-support vector regression machine.

46. The system of claim 44 wherein the video quality model comprises a kernel-based video quality model.

47. The system of claim 46 wherein the regression component is further operative to perform support vector regression using at least a predetermined kernel function, the predetermined kernel function corresponding to one of a predetermined radial basis function, a predetermined sigmoid model function, a predetermined polynomial function, and a predetermined linear function.

48. A system for measuring perceptual quality of video, the video being provided over at least one communications channel, the system comprising:
at least one feature estimator operative to obtain, from at least one or more target feature training vectors, one or more target training features of at least one target training video;
a regression component operative to perform regression using at least one of the one or more target feature training vectors and at least one or more ground-truth quality values for the at least one target training video, to produce a video quality model;
the at least one feature estimator being further operative:
to receive a target video over the at least one communications channel; and
to obtain, from the target video, information pertaining to at least one or more target features of the target video; and a perceptual quality measurement component operative to obtain a measurement of perceptual quality of the target video using at least the video quality model, the measurement of perceptual quality of the target video being based at least on the information pertaining to the one or more target features of the target video.

49. The system of claim 48 wherein the regression component is further operative to perform support vector regression using at least one of the one or more target feature training vectors.

50. The system of claim 49 wherein the regression component is further operative to perform support vector regression using at least a predetermined support vector machine (SVM), the predetermined SVM corresponding to one of an $\epsilon$-support vector regression machine, and a $\nu$-support vector regression machine.

51. The system of claim 49 wherein the video quality model comprises a kernel-based video quality model.

52. The system of claim 51 wherein the regression component is further operative to perform support vector regression using at least a predetermined kernel function, the predetermined kernel function corresponding to one of a predetermined radial basis function, a predetermined sigmoid model function, a predetermined polynomial function, and a predetermined linear function.

\* \* \* \* \*